(12) United States Patent
Talesky

(10) Patent No.: US 6,821,048 B2
(45) Date of Patent: Nov. 23, 2004

(54) COUPLING APPARATUS FOR A ROTARY HAND TOOL

(75) Inventor: Mark S. Talesky, Huntley, IL (US)

(73) Assignee: Credo Technology Corporation, Wilmington, DE (US)

( * ) Notice: Subject to any disclaimer, the term of this patent is extended or adjusted under 35 U.S.C. 154(b) by 0 days.

(21) Appl. No.: 10/122,083

(22) Filed: Apr. 12, 2002

(65) Prior Publication Data

US 2003/0193192 A1 Oct. 16, 2003

(51) Int. Cl.$^7$ ................................. F16B 21/00
(52) U.S. Cl. .................. 403/322.4; 74/502.6; 464/52
(58) Field of Search ..................... 285/81, 88, 87, 285/320; 74/502.6; 403/321, 322.1, 322.4, 323, 330; 464/52

(56) References Cited

U.S. PATENT DOCUMENTS

| | | | |
|---|---|---|---|
| 1,954,048 A | * | 4/1934 | Jeffrey et al. ............... 403/330 |
| 3,393,534 A | | 7/1968 | Hanebuth |
| 3,602,009 A | | 8/1971 | Powell |
| 3,686,896 A | | 8/1972 | Rutter |
| 4,392,836 A | | 7/1983 | Sugawara |
| 4,575,356 A | * | 3/1986 | Murohushi et al. ........... 464/52 |
| 5,161,426 A | * | 11/1992 | Marshall ..................... 403/330 |
| 5,397,270 A | | 3/1995 | Pipp, Jr. et al. |
| 5,641,238 A | | 6/1997 | Oswald |
| 5,816,623 A | * | 10/1998 | Chang ........................ 285/88 |
| 6,006,434 A | | 12/1999 | Templeton et al. |
| 6,015,168 A | * | 1/2000 | Fahl ........................... 285/81 |

FOREIGN PATENT DOCUMENTS

| | | | |
|---|---|---|---|
| FR | 2531157 | * | 2/1984 |
| FR | 2614947 | * | 11/1988 |
| JP | 5884212 | * | 5/1983 |
| JP | 5894618 | * | 6/1983 |

* cited by examiner

*Primary Examiner*—David Bochna
(74) *Attorney, Agent, or Firm*—Greer, Burns & Crain Ltd

(57) ABSTRACT

A ferrule for coupling an attachment to a rotary hand tool unit of the type that has a housing with a nose portion through which a rotary output shaft extends. The nose portion has at least one groove extending generally circumferentially around at least a part of the nose portion, so that a groove portion is located on opposite sides of the nose portion. The ferrule includes a generally hollow cylindrical body with interior and exterior surfaces with an open mounting end portion and a smaller opposite end portion to which the attachment is mounted. The open mounting end portion fits on the nose portion of the housing when the ferrule is coupled to the rotary hand tool. The ferrule further includes at least one internally protruding rib on the interior surface for aligning the ferrule in at least one predetermined angular position, and at least two latches mounted on the ferrule, with each latch having an open and a closed position wherein the ferrule is locked into the nose portion when the latch is in the closed position.

23 Claims, 9 Drawing Sheets

US 6,821,048 B2

COUPLING APPARATUS FOR A ROTARY HAND TOOL

BACKGROUND OF THE INVENTION

The present invention generally relates to an apparatus for coupling attachments to tools and the like, and more particularly to a ferrule for coupling an accessory attachment to a rotary hand tool There has been continued innovation and improvement in the design of power tools, particularly rotary hand tool units of the type that are used in woodworking, metal working and the like. Examples of such products are those made under the Dremel brand by the S-B Power Tool Corporation of Chicago, Ill., which also produces many accessory attachments for such rotary hand tool units. The rotary hand tool units are generally cylindrical in shape and contain a motor with a rotary output shaft that is adapted to drive the various rotary tool bits, such as small saw blades, sander discs, grout removal tool bits and various other cutting tool bits. There are also may accessory attachments that can be used in association with the rotary hand tool units, with the accessory attachments being connected to the stationary nose end portion of the rotary hand tool unit. Among such accessory attachments is a flexible shaft attachment that conveniently allows the user to operate the various rotary tool bits around corners or in other remote areas of operation. Also useful are grout removing tool guides that conveniently position the grout removing bit relative to the tool guide so that a user can conveniently and effectively remove grout from between individual floor and wall ceramic tiles, for example. As a further example, a depth guide is a desirable accessory attachment that can be used with many types of cutting tools to limit the depth of penetration of the tool into a work piece or work surface.

While such accessory attachments have been available for many years, the manner in which the accessory attachments are coupled to the tool has been the subject of continuing efforts to provide a simple and effective mechanism for coupling or mounting the accessory attachments to the hand tool itself. In this regard, the necessity of tightening holding screws or utilizing multiple turns of a threaded coupling mechanism for coupling the accessory attachment to the rotary hand tool, while effective, are not considered to be particularly simple and convenient in many past designs.

SUMMARY OF THE INVENTION

The present invention is related to a particularly simple, elegant and convenient coupling apparatus for attaching an accessory attachment to a rotary hand tool unit of the type that has a housing with a nose portion through which a rotary output shaft extends. The present invention enables a coupling apparatus to be placed on the nose portion in a predetermined position and secured into locking position by a pair of hinged latch members. An accessory attachment can subsequently be attached to the other end of the coupling apparatus, which then serves to couple the accessory attachment to the rotary hand tool unit.

More particularly, the coupling apparatus includes a ferrule that is provided with inwardly protruding ribs or protrusions on opposite sides of the inside of the ferrule, where the ribs engage a pair of outwardly extended elongated arcuate teeth located on the nose portion of the rotary hand tool unit. In this type of hand tool unit, which is adapted to receive another type of attachment mechanism that can be engaged and releases with only a quarter turn of rotation on a pair of teeth, each of the teeth extends approximately 90° to 100° of the circumference of the cylindrical nose portion and is curved in the axial direction so that the center of the tooth is moved in the axial direction rearwardly or away from the end of the nose end portion. The teeth form a groove portion that extends generally circumferentially around at least a part of the nose portion so that the groove portion is located on opposite sides of the nose portion, coextensive with the elongated arcuate teeth on the nose portion. The preferred embodiment of the present invention has two latch members which are also configured and arranged on the circumference of the ferrule to oppose one another, and each latch member includes an engagement protrusion for engaging the groove portion of the nose portion, and also include a locking protrusion to engage a locking flange located on the external circumference of the ferrule.

Thus, during operation, when the coupling apparatus is slipped onto the nose portion of the hand tool unit, the inwardly protruding ribs align with and engage the elongated arcuate teeth to ensure proper alignment of the accessory attachment with the nose portion. As the latch members are locked into the closed position, the engagement protrusion engages the groove portion of the nose portion. The latch members are finally locked into place by snapping the locking protrusion into the locking flange of the ferrule. The ferrule is also configured so that the latch members, when in the locked position, can be pulled upward into the open position with force enough to overcome the frictional engagement of the locking protrusion and the locking flange, subsequently making the attachment easily releasable by simply pulling the attachment from the nose portion with relatively modest force.

DETAILED DESCRIPTION OF THE INVENTION

Figure 3:
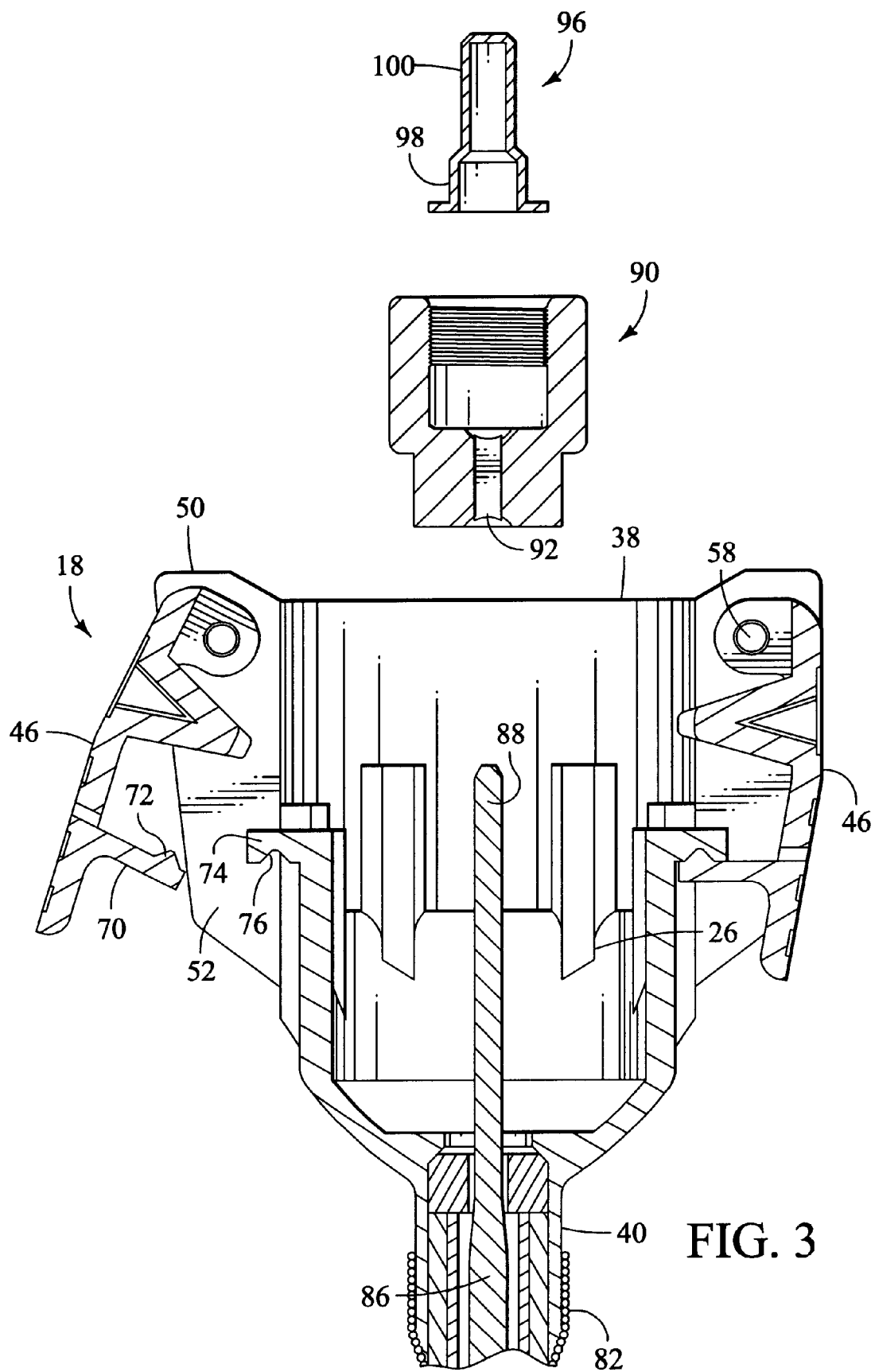
FIG. 3 is an exploded sectional view of the coupling apparatus illustrated in FIG. 1, taken along the 3—3 line of FIG. 2.
Figure 4:
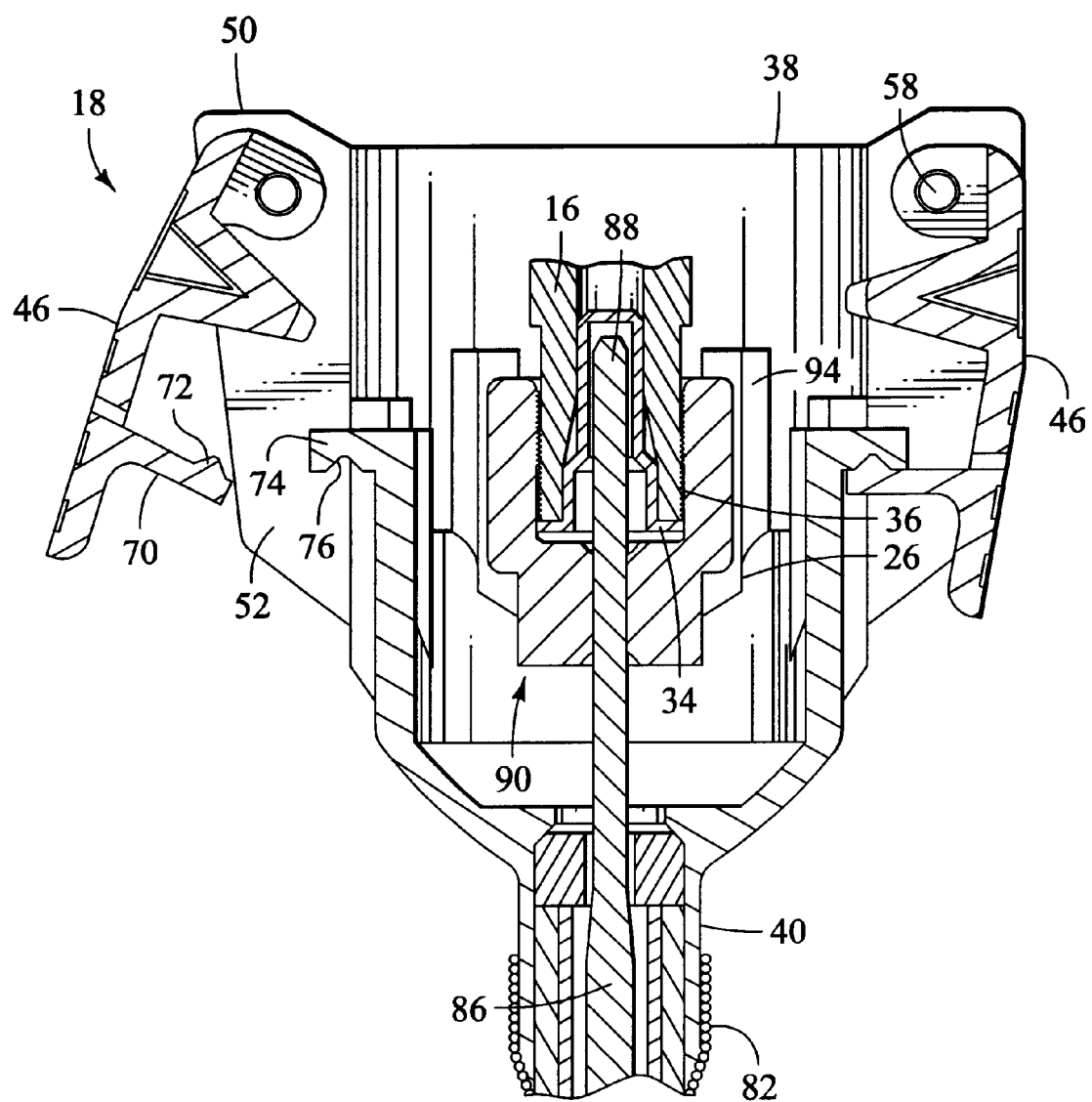
FIG. 4 is a sectional view of the coupling apparatus illustrated in FIG. 1 taken along the 3—3 line of FIG. 2.

The preferred embodiment of the coupling apparatus of the present invention is shown in the FIGS. 1 through 5, where a rotary hand tool is indicated generally at 10 and is shown in conjunction with a flexible shaft attachment indicated generally at 12. The rotary hand tool unit 10 has a nose end portion indicated generally at 14 and a rotary output shaft 16 which is illustrated in FIG. 4 and intended to be attachable to a working tool bit such as a small circular saw blade, a cutting bit, or the like. The ferrule of the coupling apparatus is designated generally as 18.

Figure 5:
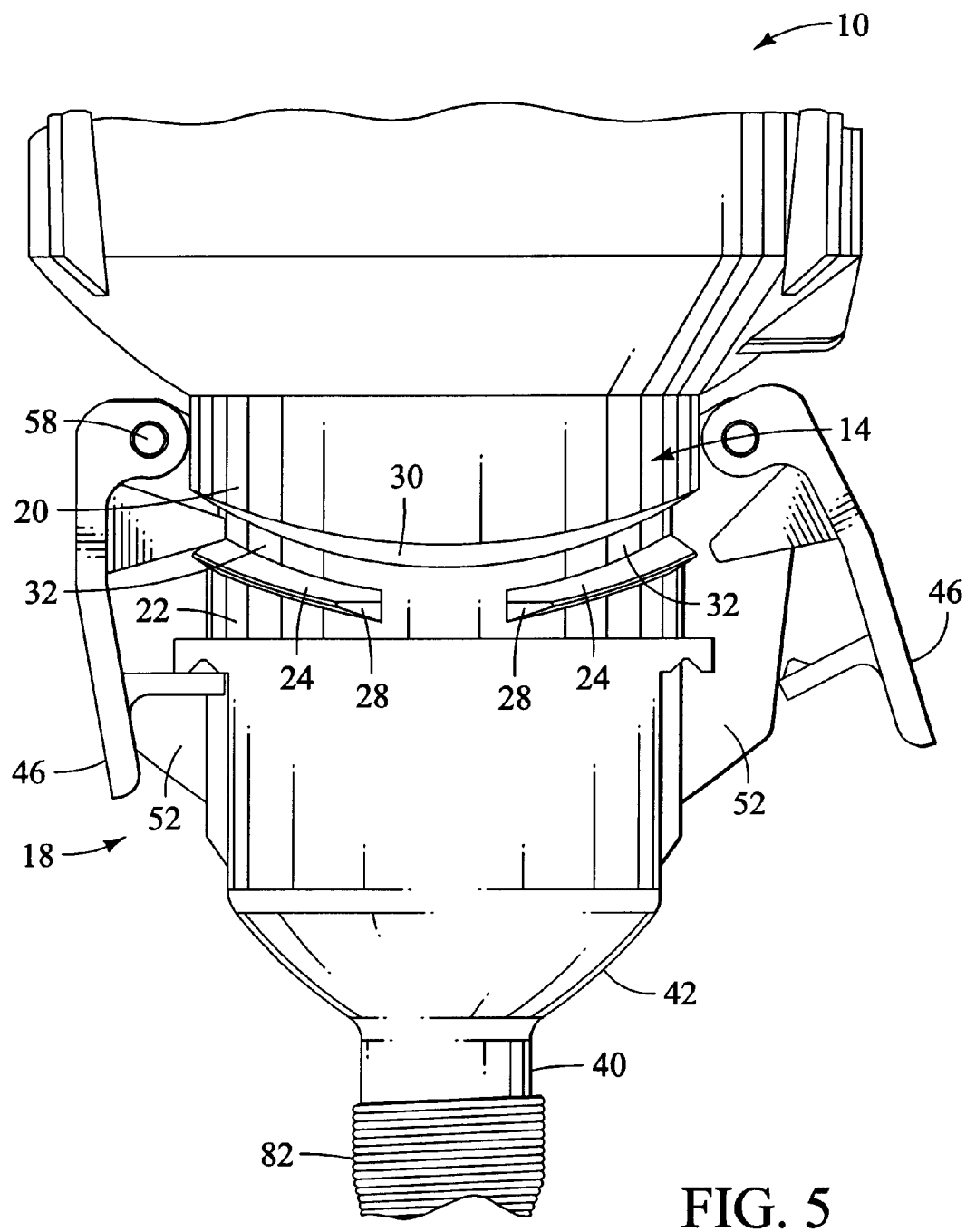
FIG. 5 is an elevational view of the coupling apparatus illustrated in FIG. 1.

The hand tool unit 10 has a housing with a motor and a drive shaft, which are not shown in the drawings. As best shown in FIG. 5, the nose portion 14 is formed with the housing and includes both an enlarged diameter portion 20 and a cylindrical shaped portion 22. The cylindrical shaped portion 22 is configured forwardly of the enlarged diameter portion 20, and the cylindrical shaped portion contains a pair of outwardly extending elongated teeth 24, each of which is curved in the axial direction so that the middle portion is more rearwardly positioned from the end of the nose portion 14 than either of the ends of the teeth. Each of the teeth 24 are diametrically opposite one another on the circumference of the cylindrical shaped portion 22. Each of the teeth 20 extends around the periphery of the cylindrical shaped portion 22 approximately 90° although it may extend to 120° or more if desired.

The adjacent ends of the teeth 24 are separated by a distance sufficient to allow internally protruding ribs 26 on the coupling apparatus to pass beyond the ends of the teeth when the coupling apparatus is being coupled to the rotary hand tool unit 10. As best illustrated in FIGS. 1 and 5, each of the elongated teeth 24 terminate at their ends in an alignment portion 28, which is flared planar surface that slopes to a reduced height measured from the surface of the cylindrical shaped portion 22 when compared to the height of the teeth portion measured from the surface of the cylindrical shaped portion.

Figure 1:
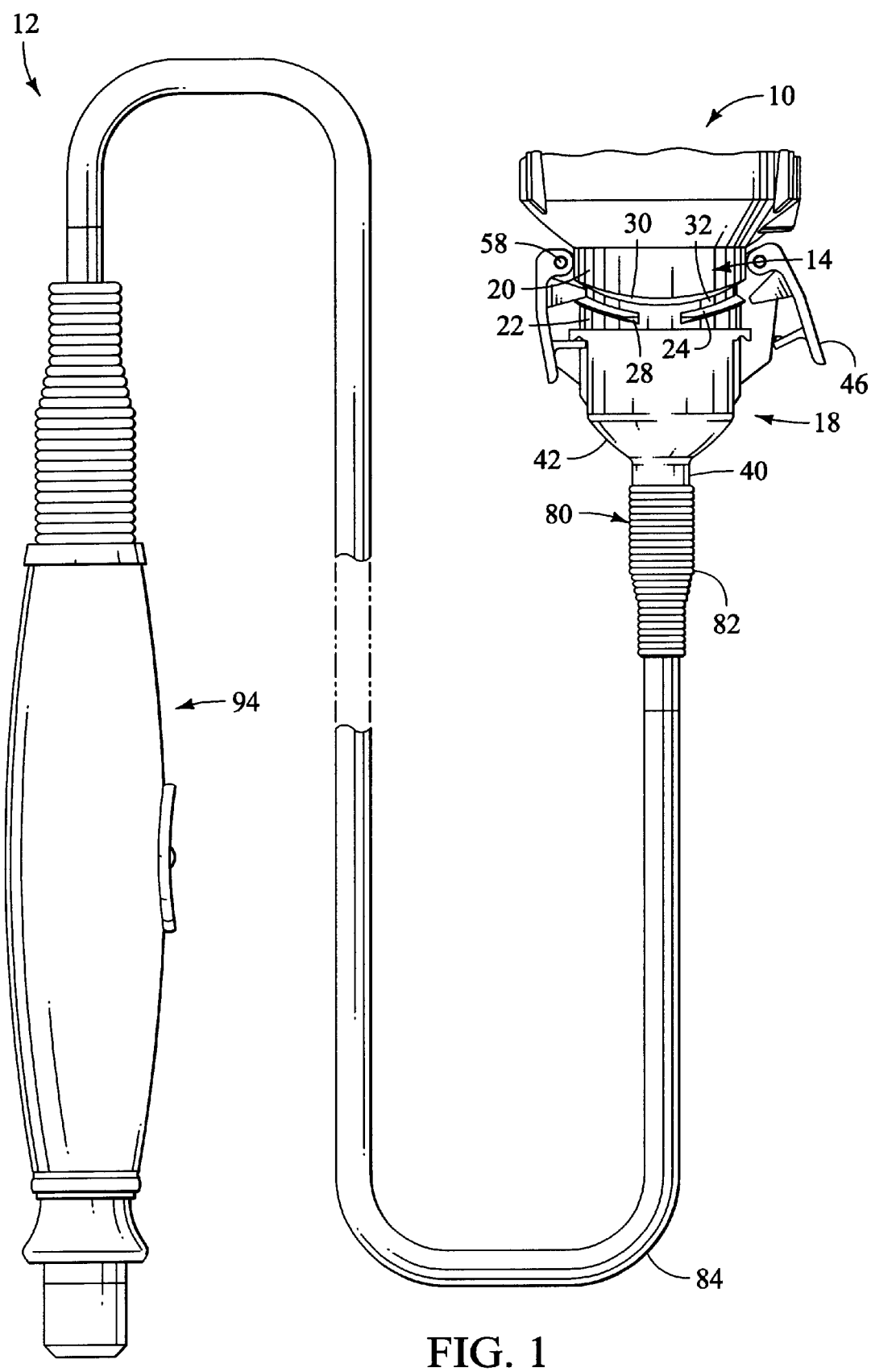
FIG. 1 is an elevational view of the coupling apparatus of the preferred embodiment having one of the pair of parallel vertical flanges removed, illustrated with a rotary tool unit and a flexible shaft attachment coupled thereto.
Figure 2:
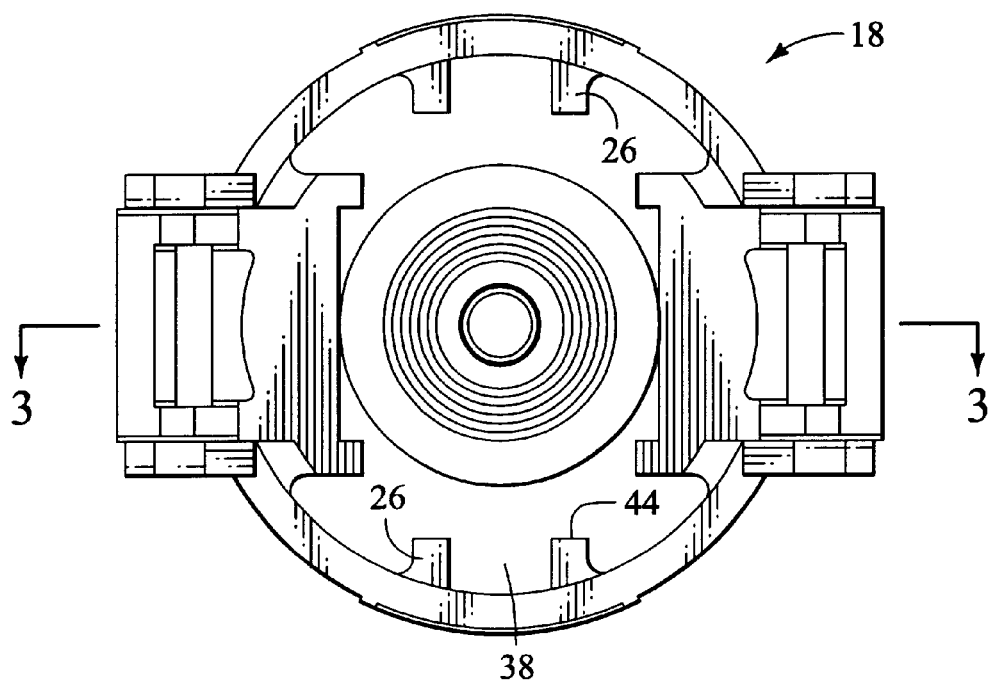
FIG. 2 is a top view of the coupling apparatus illustrated in FIG. 1.

The interface between the enlarged diameter portion and the cylindrical portion form an annular shoulder 30, and the distance between the shoulder and any correspondent axially oriented portion of the teeth 24 is substantially constant as best shown in FIGS. 1 and 5. The area defined by this distance forms a pair of convex groove portions 32 that are coextensive with the pair of outwardly extending elongated teeth 24. Like the elongated teeth 24, the groove portions 32 are diametrically opposed to one another on the cylindrical shaped portion 22, and are curved in the axial direction so that the middle portion is more rearward positioned form the end of the nose portion 14 than either of the ends of the teeth.

Ordinarily, working tools are mounted to the rotary hand tool unit 10 by a collet and a collet nut (not shown in the drawings), which are coupled to the output shaft 16 of the rotary tool unit. The rotary tool unit 10 applies rotational torque to various working tools and the rotary output shaft 16 includes an open end portion 34 having a threaded outer circumference 36. From its open end portion 34 toward the rotary tool unit, the rotary output shaft 16 has a predetermined interior depth and an inner circumference that gradually narrows, and is configured to matingly receive a collet, which has a circumference that is slightly larger than the narrowest portion of the inner circumference of the rotary output shaft. In this way, the collet is prevented from sliding into the predetermined interior depth of the rotary output shaft by the narrowing inner circumference of the rotary output shaft. The collet is held in place by a threaded collet nut, which threadedly engages the threaded outer circumference of the rotary output shaft.

The protruding end of the collet ordinarily includes an aperture surrounded by a plurality of spring-biased fingers, which operate to retain corresponding working tools inserted therein. Since the working tools, such as small saw blades and cutting bits, have base ends having a circumference that is much smaller than the open end of the open end portion of the output shaft, the spring-biased fingers of the collet prevent slippage or sliding of the base end the working tool into the output shaft. Thus, by using a collet and collet nut in combination with any number of rotary hand tool bits having shanks, various working tool bits may be inserted into and used with the rotary hand tool. However, when a rotary hand tool unit 10 is coupled to an accessory attachment, such as a flexible shaft attachment 12, via the coupling device 18 of the instant invention, the collet and collet nut are removed so that the output shaft 16 can be mechanically coupled to the flexible shaft attachment, as will be described.

Turning now to FIGS. 1 through 5, which illustrate the coupling apparatus 18 coupled to a flexible shaft attachment 12, the coupling apparatus comprises a mounting portion or ferrule having a generally hollow cylindrical body with an internal surface and an external surface. An open mounting end portion 38 is a circumferential opening in the ferrule and has a predetermined diameter configured to receive the nose portion 14 of the rotary tool unit 10. Opposite the open mounting end portion 38 is a smaller open end portion 40, to which the attachment 12 is mounted, where the smaller open end portion has a smaller diameter than the diameter of the open mounting end portion. Separating the two open end portions is a conical transition portion 42, which is a sloped, funnel-shaped portion of the ferrule 18 that gradually narrows the diameter of the ferrule, and terminates in the generally cylindrical smaller open end portion 40.

As the nose portion 14 of the rotary tool unit 10 is inserted into the open mounting end portion 38 of the ferrule 18, at least one and preferably two sets of internally protruding ribs 26 extend in an axial direction from the open mounting end portion to the conical transition portion 42. In the preferred embodiment of the instant invention, the internally protruding ribs 26 include two pair of elongated, parallel protruding ribs, with one pair of ribs being diametrically opposed to the other pair on the internal surface of the ferrule. However, the number and placement of the ribs may vary, depending on the configuration and placement of the corresponding flared planar surface of the teeth 24.

The ribs 26 and the ferrule 18 are of unitary construction, with a top surface 44 of the ribs being a planar surface. This planar surface 44 corresponds to the alignment portion 28 of the teeth 24 on the nose portion 14 of the rotary tool unit 10, and both surfaces are configured and arranged in predetermined positions so that alignment of these surfaces ensures proper alignment of the rotary tool unit within the ferrule 18. Because the height of the teeth 24 measured from the surface of the cylindrical shaped portion 22 is lowest at the alignment portions 28, the ribs 26 are configured to extend from the internal surface at a distance corresponding diameter of the nose portion 14 at the alignment portion so as to frictionally engage the alignment portion of the teeth when inserted. Because the protruding ribs 26 of the preferred embodiment are diametrically opposed, the rotary tool unit 10 only be inserted in one of two positions, which only differ by a 180° degree of separation and are indiscernible for purposes of attachment. The engagement of the alignment portion 28 with the ribs 26 therefore prevents improper alignment of the rotary tool unit 10 within the ferrule 18, and restricts rotational movement of the rotary tool unit once it is inserted into the ferrule.

Figure 6:
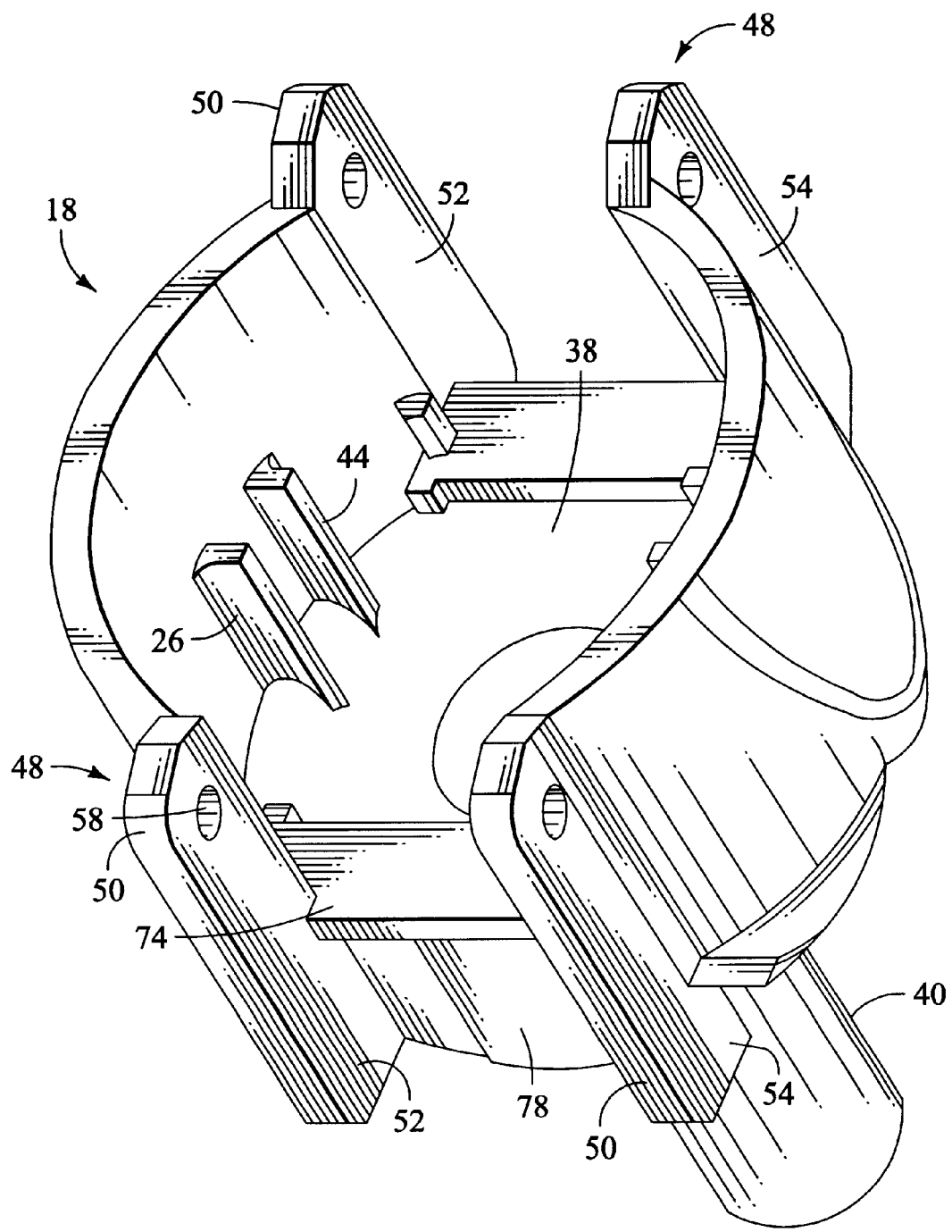
FIG. 6 is a top perspective view of the coupling apparatus illustrated in FIG. 1.
Figure 7:
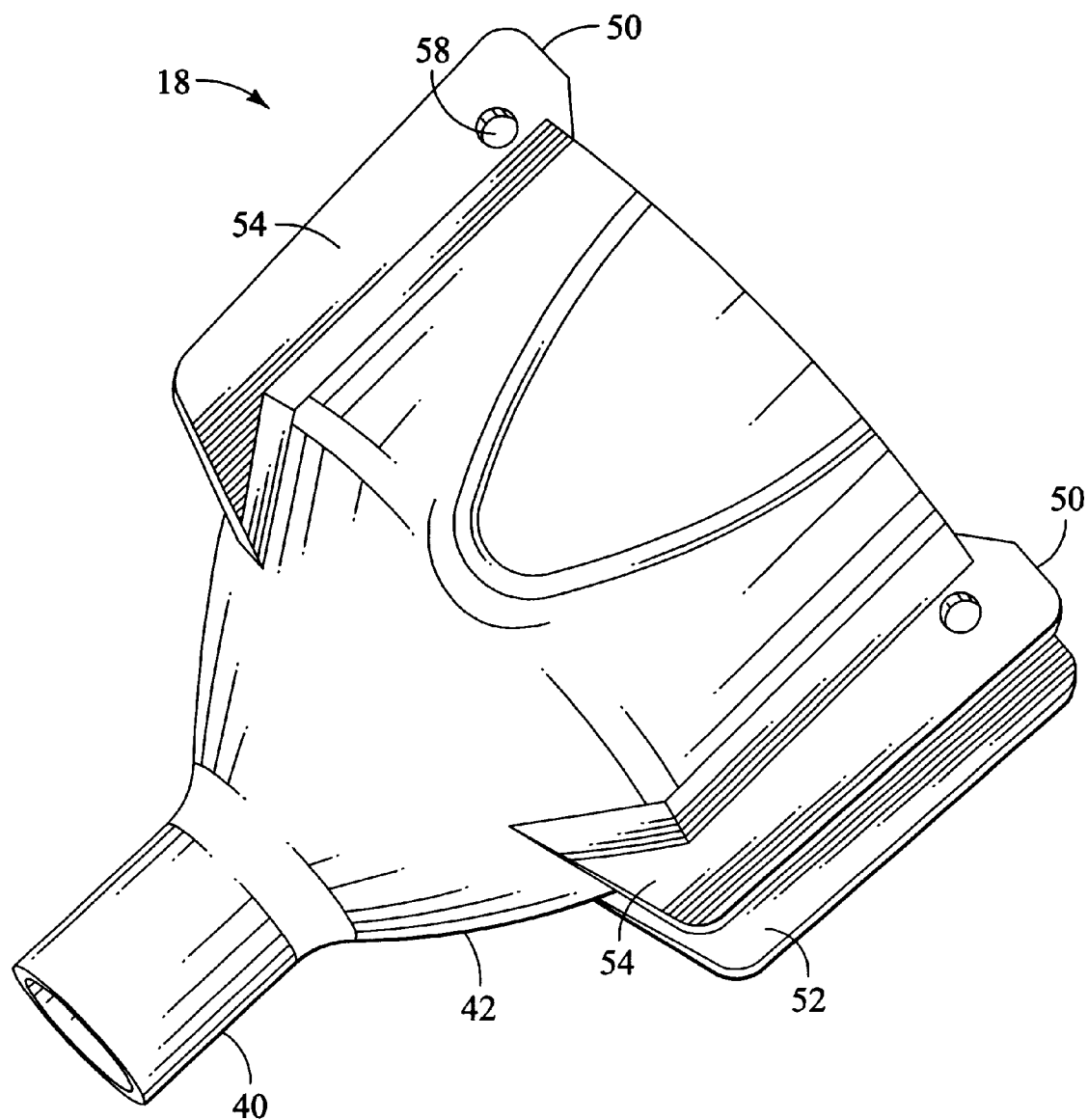
FIG. 7 is a side perspective view of the coupling apparatus illustrated in FIG. 1.

Turning now to FIGS. 3 through 5, the ferrule of the instant invention includes at least one and preferably two locking latch members 46 for releasably securing the ferrule 18 to the rotary tool unit 10. In the preferred embodiment, the external surface of the ferrule includes two diametrically opposed latch mounting portions, designated generally at 48 (best shown in FIG. 6), separated from each other by approximately 180°, to which the latch member 46 is mounted. Each latch mounting portion 48 includes a pair of parallel vertical flanges 50, which each flange having inside and outside walls 52, 54, and the inside walls of each flange face one another. Each pair of vertical flanges 50 are unitary with the external surface of the ferrule, and extend radially from the circumference of the ferrule, generally parallel to one another. There is an opening or a discontinuity in the ferrule body 18, where the opening is defined between the inside walls 52 of the pair of flanges and extends downward for at least a portion of the open mounting end portion 38. In the preferred embodiment of the instant invention, the opening in the ferrule 18 has a vertical length that is approximately one-half to two-thirds of the vertical length of the open mounting end portion 38. The opening prevents the ferrule 18 from blocking interaction between the latch members 46 and the rotary tool unit 10, once the rotary tool unit is aligned and inserted into the ferrule. It is therefore conceivable that the vertical length of the opening could be significantly shorter, or consist of an adequately sized aperture, to facilitate interaction between the latch members 46 and the rotary tool unit 10.

An upper portion of each flange 50 contains an aperture 58 for receiving a cross bar that extends between the two flanges. It is upon this cross bar (not shown) that the latch members 46 are hingedly mounted. Therefore, when mounted, the latch members 46 may swing between an upward or open position and a closed or downward position. When the latch members 46 are in the open position, the ferrule and the tool are held in alignment by frictional engagement of the alignment portion 28 and the protruding ribs 26. However, when the latch members 46 are in the closed position, the ferrule 18 and rotary tool unit 10 will be in locking engagement by at least one and preferably two of the following locking mechanisms.

Figure 8:
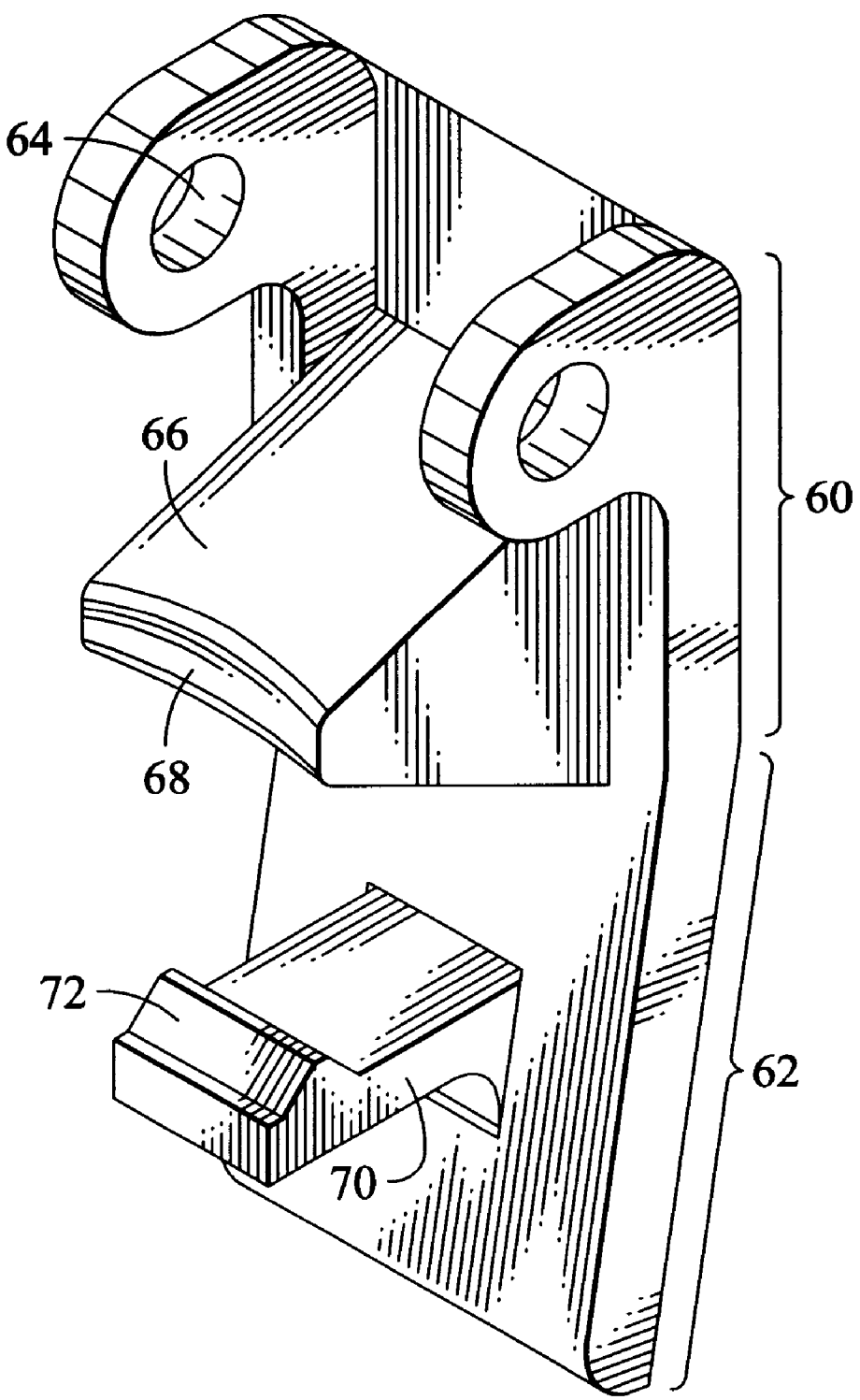
FIG. 8 is a perspective view of the latch member of the coupling apparatus illustrated in FIG. 1.

Turning now to FIG. 8, the latch members 46 themselves contain and upper portion 60 and a lower portion 62, where the upper portion depends vertically from the cross bar via apertures 64 in the upper portion of the latch members. The upper portion 60 is a generally flat surface that, when the latch members are in the closed position, rests flush in the plane defined by distal vertical edges of the vertical flanges. In contrast, the lower portion 62, while unitary with the upper portion 60, is bent slightly toward the ferrule 18 so that a distal end of the lower portion is slightly closer to the ferrule than the distal end of the upper portion. Thus, the bottom portion angles slightly inwardly toward the ferrule 18 and away from the plane defined by the distal vertical edges of the vertical flanges. The distance between the upper portion 60 of the latch member and the ferrule 18 is relatively constant, while the distance between the lower portion 62 and the ferrule will have a slight and gradual decrease at its distal end. However, the distance between the diametrically opposed latch members 46, whether taken along the upper or lower portion, is greater than the diameter of the open mounting end portion.

The top portion of the latch members 46 include a first locking protrusion 66, which in the preferred embodiment, is a wedge-shaped protrusion that extends generally perpendicularly from the latch member. This wedge-shaped protrusion 66 also includes a concave surface 68 at its distal end, which is configured to frictionally engages the convex groove portion 32 of the rotary tool unit 10 as the latch member 46 is brought into its closed position. The first locking protrusion 66 is also mechanically confined in frictional engagement at its underside by the elongated teeth 24 of the rotary tool unit 10 and at its upper side by the annular shoulder 30 between the enlarged diameter portion 20 and the cylindrical portion 22 of the rotary tool unit. This is the first of the two locking mechanisms.

For purposes of engaging the second locking mechanism, the latch members 48 further include a second locking protrusion 70 disposed on the lower portion of the latch member that also extends generally perpendicularly therefrom. The second locking protrusion 70 is planar on its underside, but preferably includes a raised end 72 on its top side. The latch mounting portion 48 also includes a generally horizontal shelf-like locking flange 74 having a top surface and a bottom surface, where the top surface is planar and the bottom surface includes an engagement recess 76, which in the preferred embodiment, is an elongated longitudinal recess. Thus, as the latch member 46 is brought into its fully closed position, the second locking protrusion 70 slides underneath the locking flange 74, frictionally engaging the bottom surface of the locking flange until the raised end 72 encounters the engagement recess 76 on the bottom surface of the locking flange and locks into place. Once the raised end 72 engages the engagement recess 76, the raised edge is mechanically secured within the engagement recess, and both locking mechanisms of the latch member are effected, making the rotary hand tool unit 10 securely and releasably mounted to the ferrule 18 of the accessory attachment 12.

The latch mounting portions 48 of the ferrule 18 are configured to allow the user to easily disengage the locking mechanisms using relatively modest force. Around the circumference of the transition portion 42, two diametrically opposed vertical cut-out portions 78 (best shown in FIG. 6) are disposed below the shelf-like locking flange 74. These vertical cut-out portions 78 are generally flat surfaces extending downward into the funnel-shaped transition portion of the ferrule, so that there is a recess in the conical shape of the transition portion 42 at each of the cut-out portions. The diameter between the recesses is less than any other given diameter of the open mounting end portion. Thus, because the distance between the diametrically opposed latch members 46, whether taken along the upper 60 or lower portion 62, is greater than the diameter of the open mounting end portion 38, there is a space between the lower portion of the latch member and the generally flat surface of the cut-out portion 78. In the preferred embodiment, the space is large enough to accommodate the user's finger, so that a user can reach into the space and pull the latch out of locking engagement. However, it is contemplated that the space could be reduced or eliminated if alternative means for opening the latch members were provided. For example, providing a grasping protrusion on an outside surface of the latch member would allow the user to pull upward on the latch member via the grasping protrusion, eliminating the need for a space.

Depending on the configuration of the specific accessory attachment 12, the preferred embodiment of the ferrule 18 contemplates that the accessory attachment may be coupled to the ferrule 18 in a multitude of ways. By way of example only, to couple the flexible shaft attachment 12 to the ferrule 18, a lower portion of the cylindrical smaller open end portion 40 slidably engages the generally cylindrical mounting portion, designated generally at 80, of the flexible shaft attachment. As illustrated in FIG. 1, the mounting portion 80 of the flexible shaft attachment 12, which includes a coiled spring 82, couples a hollow flexible rubber sheath 84 to the ferrule 18. The coiled spring 82 has an inner circumference that is slightly smaller than the outer circumference of the smaller open end portion 40 of the ferrule 18. Therefore, when the coiled spring 82 is mounted around the outer circumference of the smaller open end portion 40, the resulting force fit maintains frictional engagement of the coiled spring with the smaller open end portion of the ferrule. The flexible sheath 84 is telescopingly inserted into the coiled spring, thus aligning a top region 88 of the flexible core 86 (see FIGS. 3, 4) opening of the smaller open end portion 40, which enters the ferrule 18.

Turning now to FIGS. 3, 4, 11 and 12, when coupling a flexible shaft attachment 12 such as that illustrated in the drawings, a drive cap 90 having a n aperture therethrough 92 may be placed within the ferrule to receive the top region 88 of the flexible core 86. The aperture 92 and the top region 88 of the core 86 have square cross sections and are configured to matingly engage one another so that when the drive cap is rotated, the flexible core 86 rotates as well.

However, disengagement of the flexible core 88 and the handpiece 94 frequently occurs when the handpiece is raised in a vertical direction above the horizontal plane in which the rotary tool unit 10 is operating. The rotary output shaft 16 has a predetermined depth and a circumference that is larger than the diameter of the flexible core 86. As a consequence, the flexible core 86 that is engaged with, and protruding through the aperture 92 frequently extends into the depth of the output shaft. If not prevented from doing so, the flexible core 86 can disengage from the handpiece 94 entirely and slide further into the output shaft 16, thereby interrupting and frustrating the work of the user.

Figure 9:
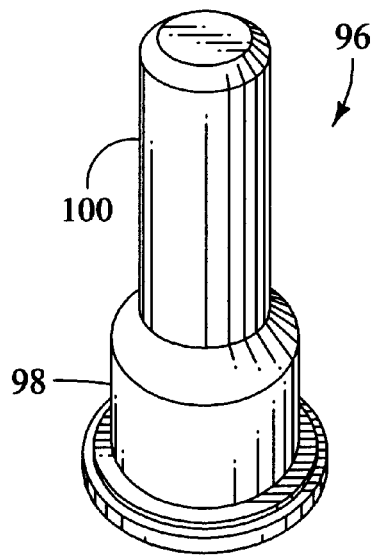
FIG. 9 is a perspective view of the stop plug apparatus used in connection with the coupling apparatus of the instant invention.
Figure 10:
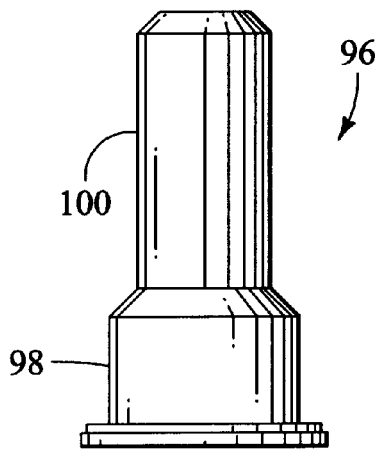
FIG. 10 is an elevational view of the stop plug apparatus of FIG. 9.
Figure 11:
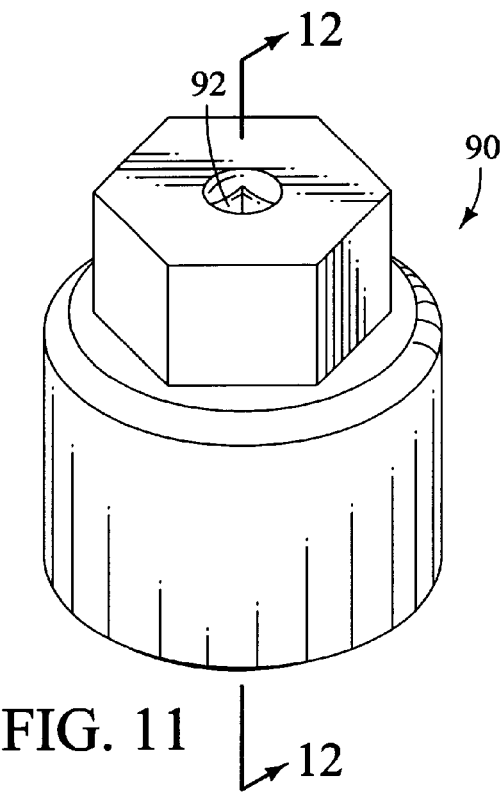
FIG. 11 is a perspective view of the drive cap used in connection with the coupling apparatus of the instant invention.
Figure 12:
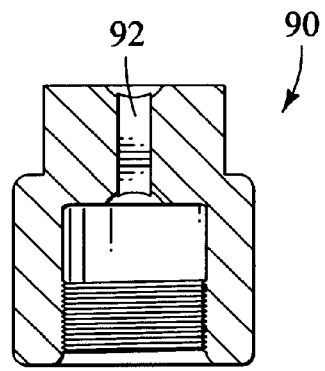
FIG. 12 is a sectional view of the drive cap of FIG. 11 taken along the 12—12 line.

Turning now to FIGS. 3, 9 and 10, when the coupling attachment 18 of the instant invention is coupled to the flexible shaft attachment 12, a stop plug apparatus 96 may optionally be used to prevent unwanted or unplanned disengagement of the flexible core 86 from the handpiece 100. The stop plug apparatus 96 is a plastic device, preferably nylon filled glass, that has an open end portion 98, a closed end portion 100, and a generally cylindrical body. The open end portion 98 of the stop plug apparatus 96 nests within the drive cap 90. Thus the open end portion 98 is aligned with the aperture 92 of the drive cap, and the open end portion accordingly receives the top region 88 of the flexible core, and the closed end portion 100 restricts axial movement in the direction of the output shaft 16.

While a particular embodiment of the present coupling apparatus has been described herein, it will be appreciated by those skilled in the art that changes and modifications may be made thereto without departing from the invention in its broader aspects and as set forth in the following claims.

What is claimed is:

1. A ferrule for coupling an attachment to a rotary hand tool of the type that has a housing with a nose portion through which a rotary output shaft extends, with the nose portion having at least one groove extending generally circumferentially around at least part of the nose portion so that a groove portion is located on opposite sides of the nose portion, said ferrule comprising:

a generally hollow cylindrical body with interior and exterior surfaces with an open mounting end portion and a smaller opposite end portion to which the attachment is mounted, the open mounting end portion fitting on the nose portion of the housing when the ferrule is coupling to the rotary hand tool;

at least one internally protruding rib on said interior surface for aligning the ferrule in at least one predetermined angular position; and at least two latches mounted on said ferrule, each latch having an open and a closed position wherein said ferrule is locked into the nose portion when said latch is in said closed position.

2. The ferrule of claim 1 wherein each of said at least two latches has a protrusion for engaging the groove portion of the nose portion.

3. The ferrule of claim 1 wherein the exterior surface of the body has a locking flange and wherein each of said at least two latches includes a locking protrusion to engage the locking flange.

4. The ferrule of claim 3 wherein said locking protrusion has a raised end and wherein said locking flange has a complementary recess for engagement of said raised end.

5. The ferrule of claim 1 wherein said at least two latches are mounted on opposite sides of said ferrule, each of said at least two latches having an open and a closed position, wherein said ferrule is locked into the nose portion when at least one of said latches is in said closed position.

6. The ferrule of claim 1 wherein said at least two latches are mounted to oppose one another on said ferrule.

7. The ferrule of claim 1 wherein said at least two latches are composed of plastic.

8. The ferrule of claim 1 wherein the attachment is a flexible shaft attached to the smaller opposite end portion.

9. The ferrule of claim 1 wherein the open mounting end portion and the smaller opposite end portion are separated by a generally conical transition portion.

10. The ferrule of claim 1 wherein the generally hollow cylindrical body has at least two mounting portions extending therefrom, wherein said at least two mounting portions are unitary with the exterior surface the generally hollow cylindrical body and configured to be separated by 180 degrees.

11. A ferrule for coupling an attachment to a rotary hand tool of the type that has a housing with a nose portion through which a rotary output shaft extends, with the nose portion having a pair of outwardly extended elongated teeth, wherein the teeth extend along a circumference of the nose portion approximately 90 to 100 degrees so that a groove portion is located on opposite sides of the nose portion, said ferrule comprising:

a generally hollow cylindrical body with an open mounting end portion and a smaller opposite end portion to which the attachment is mounted, the open mounting end portion fitting on the nose portion of the housing when the ferrule is coupled to the rotary hand tool;

at least one internally protruding rib on said interior surface for aligning the ferrule in at least one predetermined angular position; and at least two latches mounted on said ferrule, each of said at least two latches having an open and a closed position wherein said ferrule is locked into the nose portion when said latch is in said closed position, wherein each said at least two latches further include a projection for engagement of the groove portion.

12. The ferrule of claim 11 wherein said at least one internally protruding rib comprises two pair of parallel ribs, said two pair of parallel ribs being opposed to one another on an internal circumference of said ferrule.

13. The ferrule of claim 11 wherein each of said at least two latches includes a first and a second locking protrusion for locking the nose portion into place, said first protrusion engaging the groove portion of the nose portion and said second protrusion engaging said ferrule.

14. The ferrule of claim 11 wherein the elongated teeth of the nose portion include planar engagement portions for engaging said at least one internally protruding rib.

15. The ferrule of claim 11 wherein the attachment is a flexible shaft attachment having a cylindrical coiled-spring mounting portion, and said smaller opposite end portion has an external circumference that is slightly larger than an inner circumference of the mounting portion, so that when said smaller opposite end portion is inserted into the coiled-spring mounting portion, a force fit maintains engagement between the coiled-spring mounting portion and said smaller opposite end portion.

16. The ferrule of claim 11 wherein each of said at least two latches includes an upper portion and a lower portion, said upper portion being generally parallel to said open end mounting portion of said ferrule and said lower portion bending slightly inward toward said ferrule.

17. The ferrule of claim 11 further comprising a pair of opposed latch mounting portions, each of said latch mounting portions including a pair of flanges having inside and outside walls, said inside walls of said flanges being configured to face one another.

18. A ferrule for coupling an attachment to a rotary hand tool of the type that has a housing with a nose portion through which a rotary output shaft extends, with the nose portion having a pair of outwardly extended elongated teeth, wherein the teeth extend along a circumference of the nose portion approximately 90 to 100 degrees so that a groove portion is located on opposite sides of the nose portion, said ferrule comprising:

a generally hollow cylindrical body with an open mounting end portion and a smaller opposite end portion to which the attachment is mounted, the open mounting end portion fitting on the nose portion of the housing when the ferrule is coupled to the rotary hand tool;

two pair of parallel ribs configured and disposed to be opposed to one another on an internal circumference of said ferrule; and at least two latches mounted on said ferrule, each of said at least two latches having an open and a closed position wherein said ferrule is locked into the nose portion when said latch is in said closed position, wherein each said at two latches further include a projection for engagement of the groove portion.

19. The ferrule of claim 18 wherein each of said at least two latches includes a first and a second locking protrusion for locking the nose portion into place, said first protrusion engaging the groove portion of the nose portion and said second protrusion engaging said ferrule.

20. The ferrule of claim 18 wherein the elongated teeth of the nose portion include planar engagement portions for engaging said at least one internally protruding rib.

21. The ferrule of claim 18 wherein the attachment is a flexible shaft attachment having a cylindrical coiled-spring mounting portion, and said smaller opposite end portion has an external circumference that is slightly larger than an inner circumference of the mounting portion, so that when said smaller opposite end portion is inserted into the coiled-spring mounting portion, a force fit maintains engagement between the coiled-spring mounting portion and said smaller opposite end portion.

22. The ferrule of claim 18 wherein each of said at least two latches includes an upper portion and a lower portion, said upper portion being generally parallel to a latch mounting portion of said ferrule and said lower portion bending slightly inward toward said ferrule.

23. The ferrule of claim 18 further comprising a pair of opposed latch mounting portions, each of said latch mounting portions including a pair of flanges having inside and outside walls, said inside walls of said flanges being configured to face one another.

* * * * *